(12) United States Patent
Dunjic et al.

(10) Patent No.: US 11,539,705 B2
(45) Date of Patent: Dec. 27, 2022

(54) SYSTEMS AND METHODS FOR CONTROLLING THIRD-PARTY ACCESS OF PROTECTED DATA

(71) Applicant: The Toronto-Dominion Bank, Toronto (CA)

(72) Inventors: Milos Dunjic, Oakville (CA); Anthony Haituyen Nguyen, Toronto (CA); David Samuel Tax, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 153 days.

(21) Appl. No.: 16/791,362

(22) Filed: Feb. 14, 2020

(65) Prior Publication Data

US 2021/0258315 A1   Aug. 19, 2021

(51) Int. Cl.
*H04L 9/40* (2022.01)

(52) U.S. Cl.
CPC .......... *H04L 63/102* (2013.01); *H04L 63/105* (2013.01)

(58) Field of Classification Search
CPC ............................ H04L 63/102; H04L 63/105
See application file for complete search history.

(56) References Cited

U.S. PATENT DOCUMENTS

| | | | |
|---|---|---|---|
| 8,925,092 B1 * | 12/2014 | Johansson | H04L 63/1433 726/25 |
| 9,324,119 B2 | 4/2016 | Singh et al. | |
| 9,473,505 B1 | 10/2016 | Asano et al. | |
| 9,824,210 B2 | 11/2017 | Antonelli et al. | |
| 10,122,726 B2 | 11/2018 | Niemoeller et al. | |
| 10,198,597 B2 | 2/2019 | Ekambaram et al. | |
| 10,262,157 B2 | 4/2019 | Aralikatte et al. | |
| 10,498,769 B2 * | 12/2019 | Sartor | H04L 63/00 |
| 10,572,680 B2 * | 2/2020 | Dotan-Cohen | G06F 9/542 |
| 2005/0060417 A1 * | 3/2005 | Rose | H04L 67/30 709/228 |
| 2009/0276257 A1 * | 11/2009 | Draper | B25J 9/06 705/7.28 |

(Continued)

OTHER PUBLICATIONS

"Bahman Rashidi, Carol Fung, Tam Vu; RecDroid: A Resource Access Permission Control Portal and Recommendation Service for Smartphone Users; http://www.people.vcu.edu/~cfung/research/SPME2014.pdf;" Proceedings of the ACM MobiCom workshop on Security and privacy in mobile environments; Located via Google Scholar; Sep. 11, 2014.

(Continued)

*Primary Examiner* — Jason Chiang
(74) *Attorney, Agent, or Firm* — Rowand LLP (57) ABSTRACT

A server comprises a communications module, a processor coupled to the communications module, and a memory coupled to the processor, the memory storing processor-executable instructions which, when executed, configure the processor to receive, via the communications module and from a monitoring application installed on a remote computing device, on-device application data, generate a risk profile for a user based at least on the on-device application data, configure a data sharing configuration option for sharing data associated with the user based on the risk profile for the user, and share the data based on the data sharing configuration option.

20 Claims, 6 Drawing Sheets

(56) References Cited

U.S. PATENT DOCUMENTS

| | | | |
|---|---|---|---|
| 2011/0137946 A1* | 6/2011 | Siress | G06F 21/6227 707/784 |
| 2011/0185231 A1* | 7/2011 | Balestrieri | G06F 11/3672 714/27 |
| 2013/0111592 A1* | 5/2013 | Zhu | G06F 21/577 726/25 |
| 2013/0217332 A1* | 8/2013 | Altman | G01S 1/02 455/3.01 |
| 2013/0227683 A1* | 8/2013 | Bettini | G06F 21/53 726/22 |
| 2013/0276124 A1* | 10/2013 | Tahir | H04W 4/50 726/25 |
| 2013/0340086 A1* | 12/2013 | Blom | G06F 21/6245 726/26 |
| 2014/0082611 A1 | 3/2014 | Li et al. | |
| 2014/0082738 A1* | 3/2014 | Bahl | G06F 21/577 726/25 |
| 2014/0157351 A1* | 6/2014 | Canning | H04W 12/37 726/1 |
| 2014/0279641 A1* | 9/2014 | Singh | G06Q 50/265 705/325 |
| 2015/0269391 A1* | 9/2015 | Ukil | G06F 21/6254 726/30 |
| 2016/0104008 A1 | 4/2016 | Lacey et al. | |
| 2017/0344750 A1* | 11/2017 | Ekambaram | G06F 21/629 |
| 2018/0288616 A1 | 10/2018 | Knox | |
| 2019/0034621 A1* | 1/2019 | Mondello | H04L 63/04 |
| 2019/0034624 A1 | 1/2019 | Chen et al. | |
| 2019/0171845 A1* | 6/2019 | Dotan-Cohen | H04L 63/102 |
| 2020/0106780 A1* | 4/2020 | Malliah | H04L 63/102 |
| 2020/0287793 A1* | 9/2020 | Buck | G06F 21/577 |
| 2021/0089657 A1* | 3/2021 | Dunjic | G06F 21/52 |
| 2021/0234875 A1* | 7/2021 | Hecht | H04L 41/22 |
| 2021/0258321 A1* | 8/2021 | Vegulla | G06N 20/00 |

OTHER PUBLICATIONS

"Bin Liu, Mads Schaarup Andersen, Florian Schaub, Hazim Almuhimedi, Shikun Zhang, Norman Sadeh, Alessandro Acquisti; and Yuvraj Agarwal; Follow My Recommendations: A Personalized Privacy Assistant for Mobile App Permissions; https://www.usenix.org/system/files/conference/soups2016/soups2016-paper-liu.pdf;" Proceedings of the Twelfth Symposium on Usable Privacy and Security (SOUPS 2016); Located via Google Scholar Jun. 2016.

* cited by examiner

SYSTEMS AND METHODS FOR CONTROLLING THIRD-PARTY ACCESS OF PROTECTED DATA

TECHNICAL FIELD

The present disclosure relates to data security and, in particular, to systems and methods for controlling third-party access of protected data.

BACKGROUND

Private user data may be stored in a protected data resource, such as a secure database. Typically, an access control system would be implemented to prohibit unauthorized access of user data. An access control system may, for example, perform authentication of users and access approval for protected data.

In some contexts, users may wish to grant permission to third-parties to access their data at the protected data resource. For example, a third-party application on a user's computing device may request permission to retrieve data from a database record associated with the user. The user may provide, to the access control system, an indication of consent to share the data with the third-party application. The indication of consent may specify sharing permissions such as for example the type of data to be shared. For example, a user may specify whether one or more data types are to be shared. The access control system may then allow the requesting third-party application to gain access to the protected data resource for retrieving data based on the specified one or more data types.

Configuring data sharing configuration options may be difficult and/or time consuming for the user and as such the user may accept default data sharing configuration options requested by the third-party application itself. In many cases, the third-party application may ask for too much data (e.g. more than is needed to provide the functionality desired by the user).

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Accordingly, in one aspect there is provided a server comprising a communications module; a processor coupled to the communications module; and a memory coupled to the processor, the memory storing processor-executable instructions which, when executed, configure the processor to receive, via the communications module and from a monitoring application installed on a remote computing device, on-device application data; generate a risk profile for a user based at least on the on-device application data; configure a data sharing configuration option for sharing data associated with the user based on the risk profile for the user; and share the data based on the data sharing configuration option.

In one or more embodiments, the data sharing configuration option is for sharing the data with a third-party application not being represented by the on-device application data.

In one or more embodiments, the processor-executable instructions, when executed, further configure the processor to share the data with the third-party application based on the data sharing configuration option.

In one or more embodiments, the on-device application data includes at least one of a list of applications installed on the remote computing device and levels of permission granted to the installed applications.

In one or more embodiments, generating the risk profile comprises obtaining a score for at least a plurality of applications in the list of applications and generating the risk profile from the scores.

In one or more embodiments, generating the risk profile comprises obtaining a score for at least a plurality of the levels of permission and generating the risk profile from the scores.

In one or more embodiments, the data sharing configuration option specifies one or more types of data to be shared.

In one or more embodiments, configuring the data sharing configuration option for sharing data associated with the user based on the risk profile for the user comprises sending, via the communications module and to the remote computing device, a recommended data sharing configuration option; receiving, via the communications module and from the remote computing device, confirmation of the recommended data sharing configuration option; and configuring the recommended data sharing configuration option.

In one or more embodiments, configuring the data sharing configuration option for sharing data associated with the user based on the risk profile for the user comprises configuring a default data sharing configuration option; comparing a risk level of the default data sharing configuration option with the risk profile of the user; and when the risk level of the default data sharing configuration option exceeds the risk profile of the user, sending, via the communications module and to the remote computing device, an indication to the user indicating that the default data sharing configuration option exceeds the risk profile.

In one or more embodiments, the data is from a data record associated with the user.

According to another aspect there is provided a method comprising receiving, via a communications module and from a monitoring application installed on a remote computing device, on-device application data; generating a risk profile for a user based at least on the on-device application data; configuring a data sharing configuration option for sharing data associated with the user based on the risk profile for the user; and sharing the data based on the data sharing configuration option.

In one or more embodiments, the data sharing configuration option is for sharing the data with a third-party application not being represented by the on-device application data.

In one or more embodiments, the method further comprises sharing the data with the third-party application based on the data sharing configuration option.

In one or more embodiments, the on-device application data includes at least one of a list of applications installed on the remote computing device and levels of permission granted to the installed applications.

In one or more embodiments, generating the risk profile comprises obtaining a score for at least a plurality of applications in the list of applications and generating the risk profile from the scores.

In one or more embodiments, generating the risk profile comprises obtaining a score for at least a plurality of the levels of permission and generating the risk profile from the scores.

In one or more embodiments, the data sharing configuration option specifies one or more types of data to be shared.

In one or more embodiments, configuring the data sharing configuration option for sharing data associated with the user based on the risk profile for the user comprises sending, via the communications module and to the remote computing device, a recommended data sharing configuration option; receiving, via the communications module and from the remote computing device, confirmation of the recommended data sharing configuration option; and configuring the recommended data sharing configuration option.

In one or more embodiments, configuring the data sharing configuration option for sharing data associated with the user based on the risk profile for the user comprises configuring a default data sharing configuration option; comparing a risk level of the default data sharing configuration option with the risk profile of the user; and when the risk level of the default data sharing configuration option exceeds the risk profile of the user, sending, via the communications module and to the remote computing device, an indication to the user indicating that the default data sharing configuration option exceeds the risk profile.

According to another aspect there is provided a non-transitory computer-readable storage medium storing instructions that when executed by a processor of a computing system cause the computing system to receive, via a communications module and from a monitoring application installed on a remote computing device, on-device application data; generate a risk profile for a user based at least on the on-device application data; configure a data sharing configuration option for sharing data associated with the user based on the risk profile for the user; and share the data based on the data sharing configuration option.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . ." is intended to cover any one or more of the listed elements, including any one of the listed elements alone, any sub-combination, or all of the elements, without necessarily excluding any additional elements, and without necessarily requiring all of the elements.

Access control is an important element of database security. Various security controls may be implemented for a database to safeguard the data and any operations within the database from unauthorized access. An access control system for a database typically performs functions of authentication and access approval to ensure that only authorized users can gain access to the database. For example, a private database may store account data for a plurality of user accounts, and an access control system for the database may enforce security policies to restrict access to the user account data.

An access control system may enable users to define permissions for others to access their data. In particular, users may specify which subjects are allowed to access their data and what privileges are given to those subjects. For example, account data for user accounts in a database may be accessible to only those entities that have been assigned access rights by the users associated with the accounts. The access control system for the database may limit the scope of permitted access operations based on the permissions that are defined by the users.

In some contexts, users may wish to allow third-party applications access to their data in a protected database. For example, a user may provide consent for third-party applications on their device to gain direct access to their account data. The concept of "open banking" is an example of a secure, standardized release of private user data to third-parties. Open banking allows users to grant third-party developers access to their banking data. Banks that allow such third-party access may benefit from having a larger ecosystem of applications and services that customers can use to access a wide range of banking functions. In particular, banks would not have to assume all responsibility for applications development by themselves; instead, third-party developers that are granted access to user data can develop applications that are suited for use by the banks' customers.

Generally, delegating access of user account data to third-party applications raises concerns about the security of the data and the safety level of the applications. For example, where a third-party application requests to access highly sensitive user data or to perform database operations that result in permanent changes to the user data, a balance between security of the user data and ease of control of third-party access will be desired.

As different applications generally have different demands for and use of private user data, users that provide consent for third-party applications to access their private data may not fully appreciate the risks involved in granting such access. For example, it may be difficult for users to gauge the risks of security threats, such as data leakage and unauthorized transactions, or redundant collection of data arising from third-party access of user account data.

The present disclosure provides techniques to address security concerns relating to third-party applications. Specifically, systems and methods are described for generating a risk profile of the user and for configuring a data sharing configuration option for sharing data based on the risk profile of the user. In some embodiments, the data sharing configuration option may be for sharing data with a third-party application and may specify one or more types of data to be shared with the third-party application.

Figure 1:
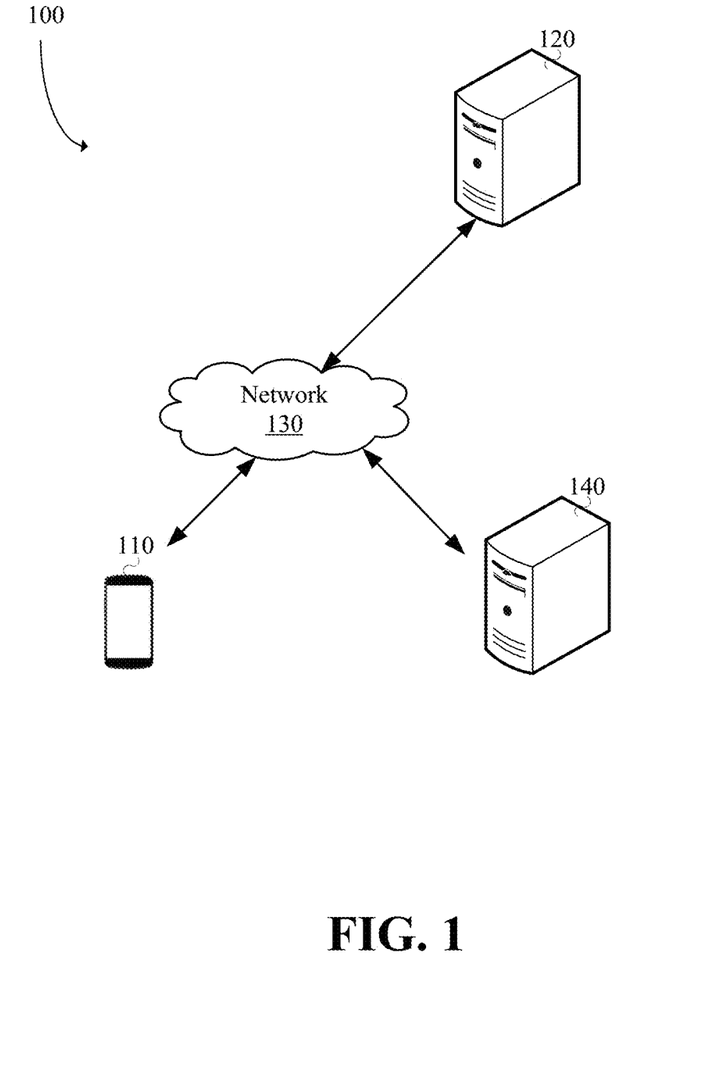
FIG. 1 is a schematic operation diagram illustrating an operating environment of an example embodiment.

FIG. 1 is a schematic operation diagram illustrating an operating environment of an example embodiment. FIG. 1 illustrates a system 100 for controlling third-party access to protected data.

As shown, a computing device 110 and a server 120 communicate via a network 130. The computing device 110 may be referred to as a mobile computing device or a remote computing device and may be associated with an entity, such as a user or a client, having resources associated with the server 120.

The server 120 may be referred to as an access control server and may be configured to control access to protected data. The server 120 may maintain database records for a plurality of users. In at least some embodiments, the server 120 is a financial institution server which may maintain customer bank accounts. That is, the server 120 may maintain a database that includes various data records. A data record may, for example, reflect an amount of value stored in a particular account associated with a user. The server 120 may protect the data using bank-grade security.

While FIG. 1 illustrates a single server 120, more than one such server may be engaged and connected through the network 130. Further, the single server 120 may be connected to a data resource such as for example a computer system that includes one or more database servers, computer servers, and the like. The protected data resource may be for example an application programming interface (API) for a web-based system, operating system, database system, computer hardware, or software library.

The system 100 also includes at least one application server 140. The application server 140 may be associated with a third-party application (such as a web or mobile application) that is resident on the computing device 110 and/or an API. For example, the application server 140 may connect the computing device 110 to a back-end system associated with the third-party application. The capabilities of the application server 140 may include, among others, user management, data storage and security, transaction processing, resource pooling, push notifications, messaging, and off-line support of the third-party application. The application server 140 is connected to the computing device 110 and the server 120 via the network 130.

The computing device 110, the server 120 and the application server 140 may be in geographically disparate locations. Put differently, the computing device 110 and the server 120 and the application server 140 may be remote from one another.

The computing device 110, the server 120 and the application server 140 are computer systems. The computing device 110 may take a variety of forms including, for example, a mobile communication device such as a smartphone, a tablet computer, a wearable computer such as a head-mounted display or smartwatch, a laptop or desktop computer, or a computing device of another type. In certain embodiments, a user may operate the computing device 110 to cause the computing device 110 to perform one or more operations consistent with the disclosed embodiments.

The network 130 is a computer network. In some embodiments, the network 130 may be an internetwork such as may be formed of one or more interconnected computer networks. For example, the network 130 may be or may include an Ethernet network, an asynchronous transfer mode (ATM) network, a wireless network, a telecommunications network or the like.

In the example of FIG. 1, the server 120 may provide data processing (e.g. bill payment) and data holding (e.g. banking) functions. That is, the server 120 may be a financial institution server and bill payment processing server. The server 120 may communicate with the computing device 110 and the application server 140 via the network 130 to control third-party access of protected data. Operations associated with the server 120 will be described in greater detail below.

Figure 2:
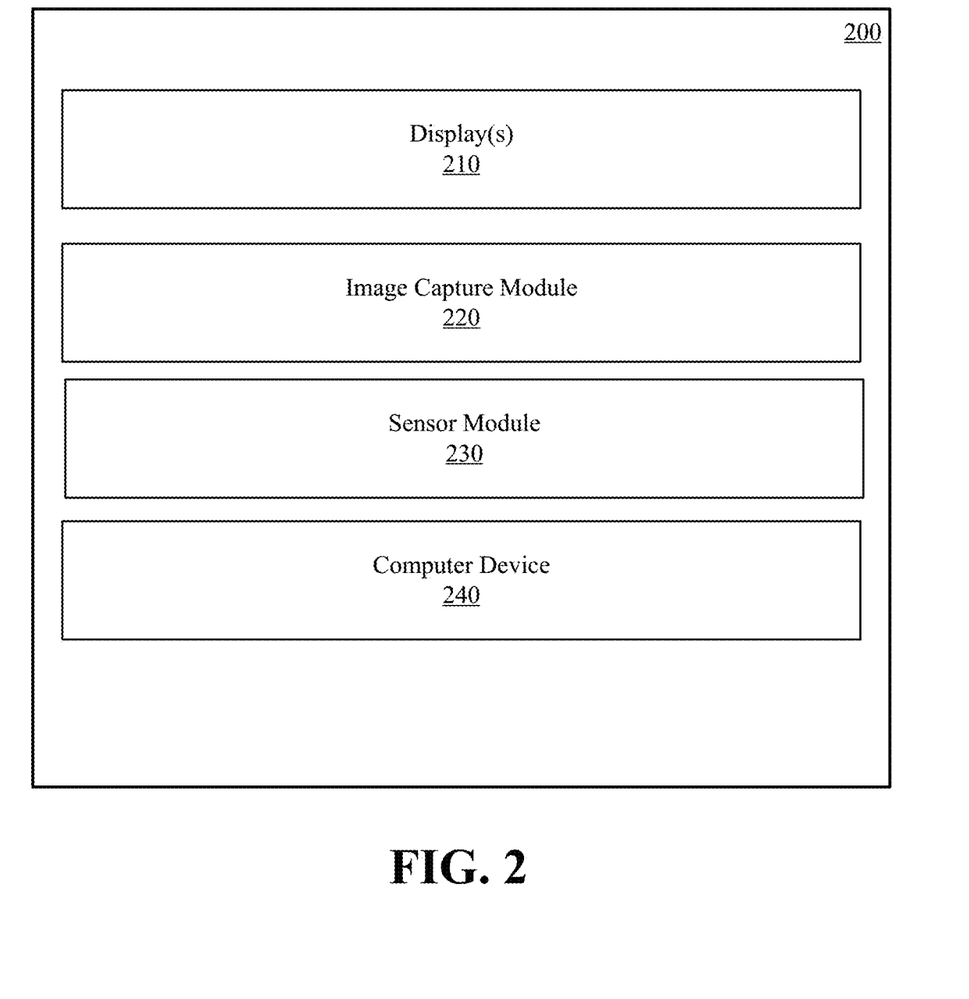
FIG. 2 is a simplified schematic diagram showing components of a computing device.

FIG. 2 is a simplified schematic diagram showing component of an exemplary computing device 200. Computing device 110 may be of the same type as computing device 200. The computing device 200 may include modules including, as illustrated, for example, one or more displays 210, an image capture module 220, a sensor module 230, and a computing device 240.

The one or more displays 210 are a display module. The one or more displays 210 are used to display screens of a graphical user interface that may be used, for example, to communicate with the server 120 (FIG. 1). The one or more displays 210 may be internal displays of the computing device 200 (e.g., disposed within a body of the computing device).

The image capture module 220 may be or may include a camera. The image capture module 220 may be used to obtain image data, such as images. The image capture module 220 may be or may include a digital image sensor system as, for example, a charge coupled device (CCD) or a complementary metal-oxide-semiconductor (CMOS) image sensor.

The sensor module 230 may be a sensor that generates sensor data based on a sensed condition. By way of example, the sensor module 230 may be or include a location subsystem which generates location data indicating a location of the computing device 200. The location may be the current geographic location of the computing device 200. The location subsystem may be or include any one or more of a global positioning system (GPS), an inertial navigation system (INS), a wireless (e.g., cellular) triangulation system, a beacon-based location system (such as a Bluetooth low energy beacon system), or a location subsystem of another type.

The computer device 240 is in communication with the one or more displays 210, the image capture module 220, and the sensor module 230. The computer device 240 may be or may include a processor which is coupled to the one or more displays 210, the image capture module 220, and/or the sensor module 230.

Figure 3:
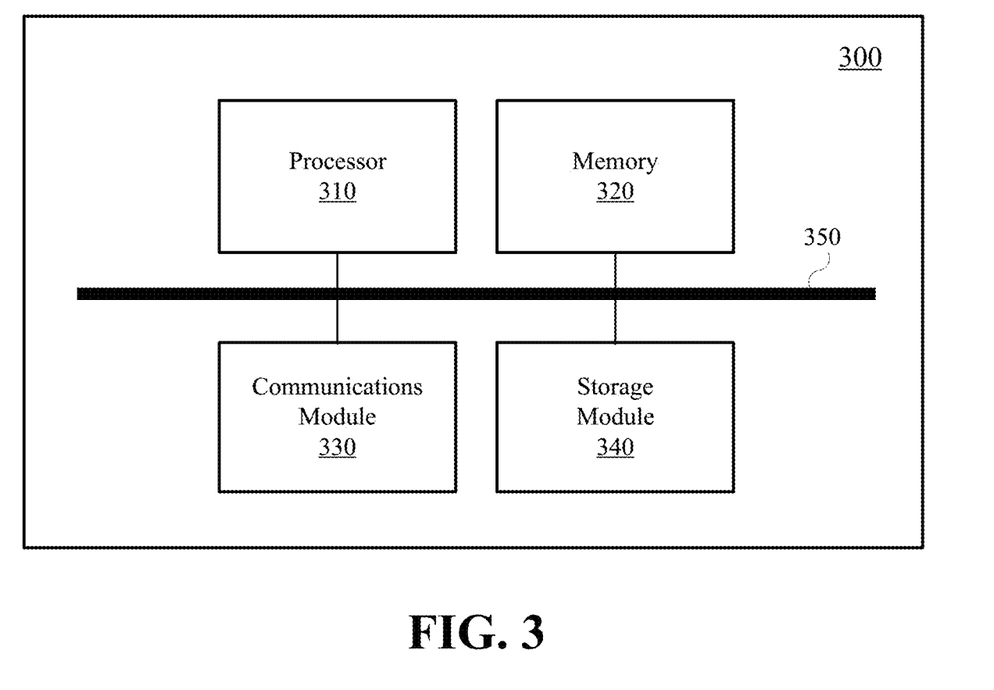
FIG. 3 is a high-level schematic diagram of an example computer device.

Referring now to FIG. 3, a high-level operation diagram of an example computer device 300 is shown. In some embodiments, the computer device 300 may be exemplary of the computer device 240 (FIG. 2), the server 120 and/or the application server 140.

The example computer device 300 includes a variety of modules. For example, as illustrated, the example computer device 300 may include a processor 310, a memory 320, a communications module 330, and/or a storage module 340. As illustrated, the foregoing example modules of the example computer device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computer device 300.

The communications module 330 allows the example computer device 300 to communicate with other computer or computing devices and/or various communications networks. For example, the communications module 330 may allow the example computer device 300 to send or receive communications signals. Communications signals may be sent or received according to one or more protocols or according to one or more standards. For example, the communications module 330 may allow the example computer device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like.

Additionally or alternatively, the communications module 330 may allow the example computer device 300 to communicate using near-field communication (NFC), via Wi-Fi™, using Bluetooth™ or via some combination of one or more networks or protocols. In some embodiments, all or a portion of the communications module 330 may be integrated into a component of the example computer device 300. For example, the communications module may be integrated into a communications chipset. In some embodiments, the communications module 330 may be omitted such as, for example, if sending and receiving communications is not required in a particular application.

The storage module 340 allows the example computer device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Software comprising instructions is executed by the processor 310 from a computer-readable medium. For example, software may be loaded into random-access memory from persisted storage of the memory 320. Additionally or alternatively, instructions may be executed by the processor 310 directly from read-only memory of the memory 320.

Figure 4:
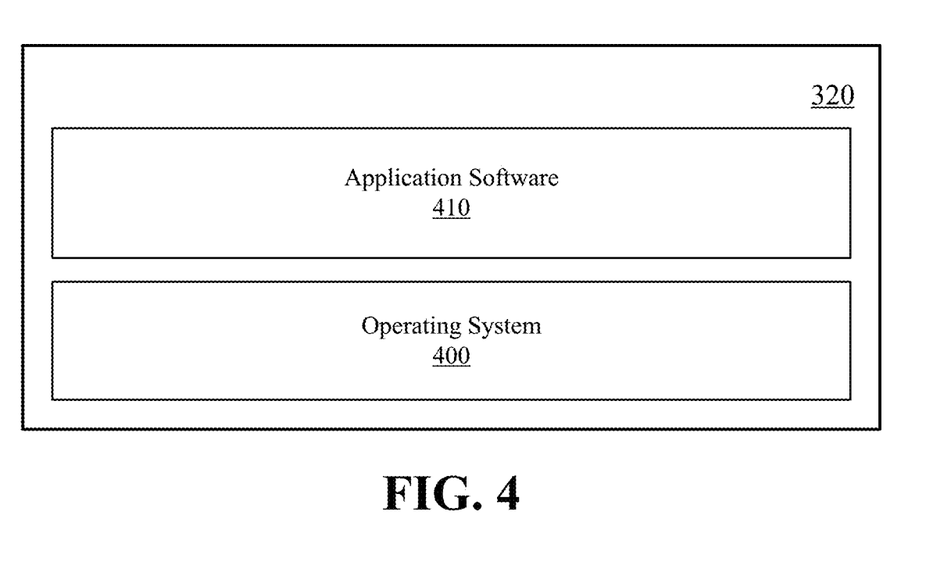
FIG. 4 shows a simplified organization of software components stored in a memory of the example computer device of FIG. 3.

FIG. 4 depicts a simplified organization of software components stored in the memory 320 of the example computer device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computer device 300 (FIG. 3). The operating system 400 may be, for example, Google™ Android™, Apple™ iOS™, UNIX™, Linux™, Microsoft™ Windows™, Apple OSX™ or the like.

The application 410 adapts the example computer device 300, in combination with the operating system 400, to operate as a device performing a particular function. For example, the application 410 may cooperate with the operating system 400 to adapt a suitable embodiment of the example computer device 300 to operate as the computing device 240 (FIG. 2) of computing device 110 (FIG. 1), the server 120 (FIG. 1), and/or the application server 140.

While a single application 410 is illustrated in FIG. 3, in operation the memory 320 may include more than one application 410 and different applications 410 may perform different operations. For example, in at least some embodiments in which the computer system 300 is functioning as the computing device 110, the applications 410 may include a monitoring application for communicating on-device application data to the server 120. The on-device application data may include one or more of a list of applications installed on the computing device 110, levels of permission granted to the installed applications, internet search history data, and/or activity data indicating activity performed on the computing device 110. The monitoring application may only need to be installed on the computing device 110 for a period of time to allow the server 120 to obtain the on-device application data. The monitoring application may be deleted from the computing device 110 automatically or manually. The monitoring application, when installed on the computing device 110, may be configured like a Virtual Private Network (VPN) such that one or more other applications installed on the computing device 110 may send and receive data through the monitoring application.

In at least some embodiments, the server 120 may be configured, through computer-executable instructions, to obtain the on-device application data from the computing device 110 to generate a risk profile for a user of the computing device 110 and to configure one or more data sharing configuration options for sharing data associated with the user of the computing device 110.

By way of further example, in at least some embodiments in which the computer system 300 functions as the computing device 110, the applications 410 may include a web browser, which may also be referred to as an Internet browser. In at least some such embodiments, the server 120 may be a web server that may serve one or more of the interfaces described herein. The web server may cooperate with the web browser and may serve an interface when the interface is requested through the web browser. For example, the web server may serve as a mobile banking interface.

By way of further example, in at least some embodiments in which the computer system 300 functions as the computing device 110, the applications 410 may include an electronic messaging application. The electronic messaging application may be configured to display a received electronic message such as an email message, short messaging service (SMS) message, or a message of another type.

Embodiments of operations performed by the server 120 will now be described.

Figure 5:
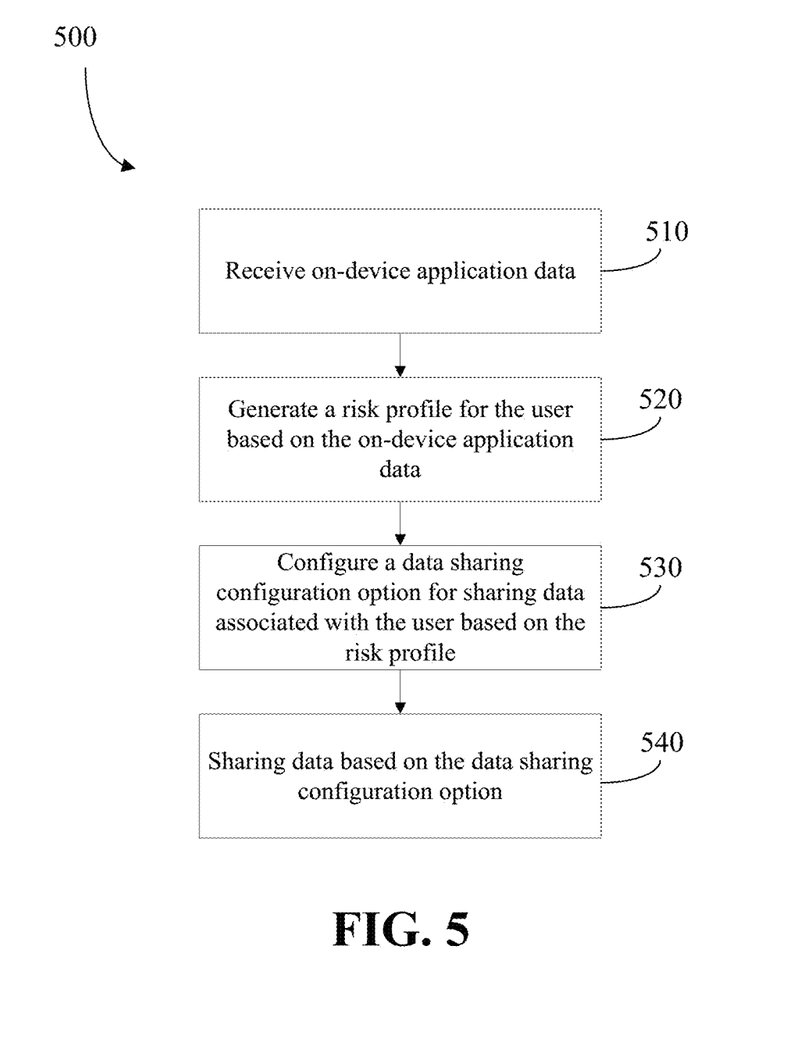
FIG. 5 is a flowchart showing operations performed by a server in controlling third-party access of protected data according to an embodiment.

FIG. 5 is a flowchart showing operations performed by the server 120 according to an embodiment. The operations may be included in a method 500 which may be performed by the server 120. For example, computer-executable instructions stored in memory of the server 120 may, when executed by a processor of the server 120, configure the server 120 to perform the method 500 or a portion thereof.

The method 500 begins when the server receives, via the communications module and from a monitoring application installed on the computing device 110, on-device application data (step 510). In this embodiment, the on-device application data includes information relating to applications installed on the mobile device. Specifically, the on-device application data includes a list of applications installed on the mobile device and levels of permission granted to the installed applications. The levels of permission may include permissions granted to access one or more resources of the mobile device such as for example access to physical modules and/or storage data. Examples of physical modules include the image capture module (e.g. camera), sensor module, vibrator, speaker, microphone, Bluetooth™ module. Examples of storage data include contacts, calendars, reminders, photos, media player data, etc. Other resources that may be accessed include location data.

Figure 6:
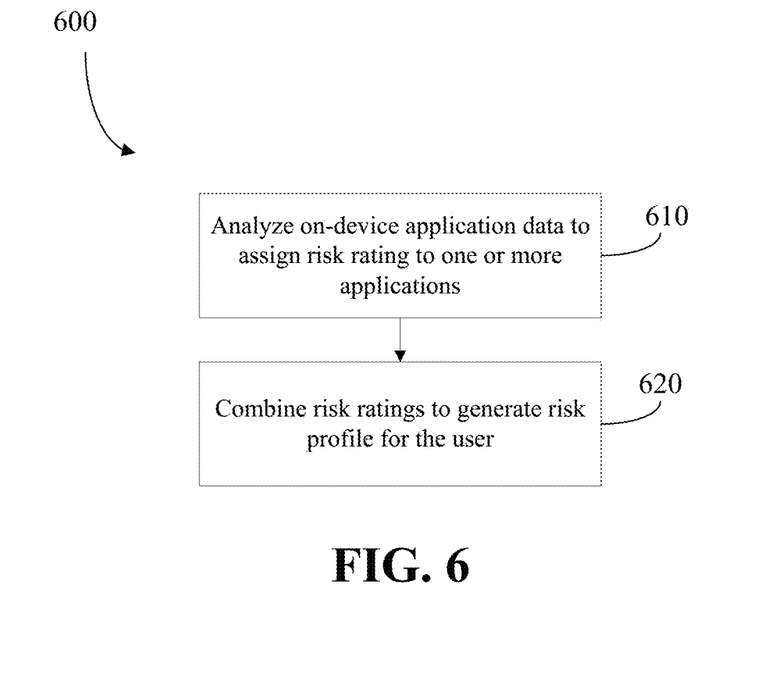
FIG. 6 is a flowchart showing operations performed by a server in generating a risk profile for a user.

A risk-profile for a user of the computing device 110 is generated based on the on-device application data (step 520). The risk-profile for the user indicates how risky the user's behavior is considered to be and/or a comfort level the user appears to have with respect to sharing personal data. FIG. 6 is a flowchart showing operations performed by the server 120 to generate the risk-profile for the user according to an embodiment. The operations may be included in a method 600 which may be performed by the server 120. For example, computer-executable instructions stored in memory of the server 120 may, when executed by a processor of the server 120, configure the server 120 to perform the method 600 or a portion thereof.

During method 600, the on-device application data is analyzed to assign a risk rating to one or more of the applications (step 610). In this embodiment, the risk rating is based on levels of permission granted to the application and knowns risks associated with a particular application.

For example, if an application is granted access to a resource of the computing device 110, the risk rating for the application may be assigned a binary "0" if access to that particular resource is deemed to be safe or not-risky and a binary "1" if access to that particular resource is deemed to be unsafe or risky. Put another way, the risk rating for the application may be deemed to be safe or not-risky if the application does not have access to personal data and may be deemed to be unsafe or risky if the application has access to personal data. For example, if an application is granted access to the vibrator of the computing device 110, this may be deemed to be non-risky and as such the level of permission for the application is assigned a binary "0".

As will be appreciated, an application may be granted access to multiple resources of the computing device 110 and as such the risk rating for the application may be determined by summing the binary result for all of the resources the application has access to. For example, an application may be granted access to the vibrator and the camera of the computing device 110. Access to the vibrator may be deemed to be non-risky and may be assigned a binary "0". Access to the camera may be deemed to be risky and may be assigned a binary "1". The sum of the binary results for the application is calculated as 0+1=1 and as such the risk rating of the application is one (1).

As will be appreciated, a maximum risk rating may be set. For example, the maximum risk rating may be set as five (5). As such, if an application is granted access to five (5) or more resources deemed to be risky, the risk rating of the application is set at the maximum rating of five (5).

Known risks of an application may be obtained by the server 120. For example, if an application is known to be risky (e.g. based on history of the application or if the application is unknown or unrecognized by the server 120), the risk rating of the application may be set at the maximum rating of five (5). Similarly, if an application is known to be safe or not-risky, the risk rating of the application may be set at the minimum rating of zero (0). As will be appreciated, the risk rating of the application may be known by the server and may be set as any number between the minimum risk rating and the maximum risk rating.

It will be appreciated that in another example the risk rating of the applications may be set on a difference scale such as for example between zero (0) and ten (10).

The risk ratings for all applications analyzed during step 610 are combined to generate a risk profile for the user (620). In this example, the risk profile for the user is generated by calculating an average risk rating. Specifically, the risk rating for all applications analyzed during step 610 are summed and the result is divided by the number of applications analyzed. For example, five (5) applications may be analyzed during step 610 and may be assigned respective risk ratings of 0, 0, 5, 3 and 2. The sum of the risk ratings is 10 and the number of applications analyzed is 5. As such, the risk profile for the user is determined to be 10/5=2. It will be appreciated that in this example the minimum risk profile for a user is zero (0) and the maximum risk profile for a user is five (5).

As will be appreciated, the risk profile for a user may be calculated in other ways. For example, a risk profile may be computed by adjusting an initialized score based on each risk rating for the applications.

Referring back to FIG. 5, a data sharing configuration option is configured for sharing data associated with the user based on the risk profile of the user (step 530). In this embodiment, the risk profile of the user is analyzed to configure a data sharing configuration option. For example, if the risk profile of the user is determined to be zero (0) or one (1), it may be determined that the user is not-risky (zero-risk) and does not want to share personal data and as such the data sharing configuration option may be set such that no personal data is shared. If the risk profile of the user is determined to be two (2) or three (3), it is determined that the user is somewhat comfortable (medium-risk) with sharing personal data and as such the data sharing configuration option may be set such that some or a limited amount of personal data is shared. If the risk profile of the user is determined to be four (4) or five (5), it is determined that the user is risky (high-risk) and is comfortable or willing to share personal data and as such the data sharing configuration option may be set such that all or a maximum amount of personal data is shared.

Data is shared based on the data sharing configuration option (step 540). As configured during step 530, the data sharing configuration option may be set such that no personal data is shared, some personal data is shared, or all available personal data is shared. The data may be shared such that it is always available or it may be shared such that it is only provided when requested.

Method 500 may be used in open banking to share personal banking data with a third-party application. For example, on-device application data may be received (step 510) and a risk profile for a user may be generated (step 520). In this example, the third-party application is not represented by the on-device application data. Alternatively, the third-party application may be included in the on-device application data but may be ignored or excluded when generating the risk profile for the user. A data sharing configuration option for sharing data associated with the user may be configured based on the risk profile of the user (step 530). The data may be banking data associated with the user and the data sharing configuration option may be based on the banking data. For example, banking data may include personal contact information, a bank balance and transaction history. Sharing the bank balance may be less risky than sharing the transaction history as the risk of fraud when sharing the bank balance is less than the risk of fraud when sharing the transaction history. The data sharing configuration option may be configured to share only the personal contact information (zero-risk), share the personal contact information and the bank balance (medium-risk), or share the personal contact information, bank balance and the transaction history (high-risk). The banking data is then shared with the third-party application based on the data sharing configuration option (step 540).

Figure 7:
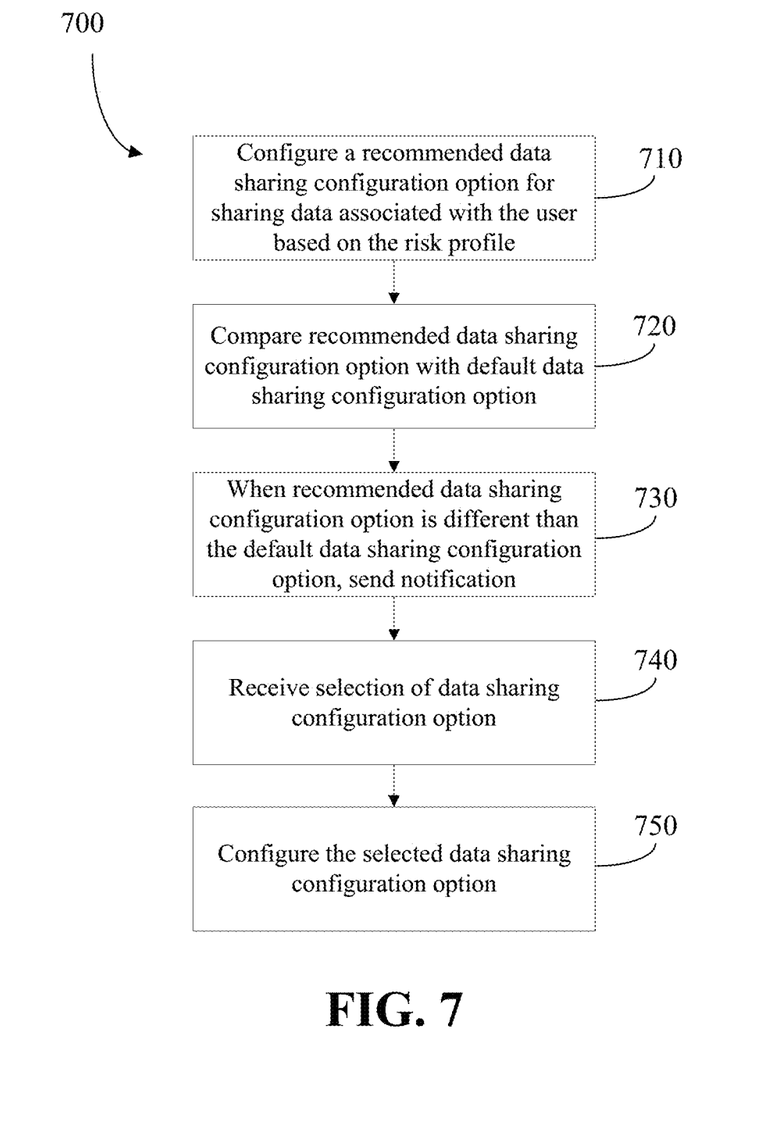
FIG. 7 is a flowchart showing operations performed by a server in configuring a data sharing configuration option.

As will be appreciated, third-party applications may include a default data sharing configuration option that may not equal the risk profile of the user. In this embodiment, the data sharing configuration option may be generated as a recommended data sharing configuration option and may be used to override or update the default data sharing configuration option. FIG. 7 is a flowchart showing operations performed by the server 120 in this embodiment. The operations may be included in a method 700 which may be performed by the server 120. For example, computer-executable instructions stored in memory of the server 120 may, when executed by a processor of the server 120, configure the server 120 to perform the method 700 or a portion thereof. The method 700 may be performed during step 530 of method 500 described above.

A recommended data sharing configuration option is configured for sharing data associated with the user based on the risk profile of the user (step 710). The recommended data sharing configuration option is generated in a manner similar to that described above with reference to step 530.

The recommended data sharing configuration option is compared to a default data sharing configuration option (step 720). In this embodiment, the default data sharing configuration option is analyzed to determine a risk level and this risk level is compared to that of the recommended data sharing configuration option.

When it is determined that the recommended data sharing configuration is different than the default data sharing configuration option, a notification is sent, via the communications module and to the computing device 110, indicating to the user that the default data sharing configuration option is different than the recommended data sharing configuration option (step 730). For example, the notification may indicate that the default data sharing configuration option is riskier than the user may be comfortable with and may recommend that the user configure the recommended data sharing configuration option. As another example, the notification may indicate that the default data sharing configuration option is less risky than the user may be comfortable with and may recommend that the user configure the recommended data sharing configuration option. The notification may include a selectable option asking the user to select the recommended data sharing configuration option or the default recommended data sharing configuration option.

Confirmation of the data sharing configuration option is received via the communications module and from the computing device 110 (step 740). In this embodiment, the confirmation may indicate that the user would like to configure the recommended data sharing configuration option or the default data sharing configuration option. The selected data sharing configuration option is then configured (step 750). For example, if the user indicates that they would prefer the recommended data sharing configuration option, then the recommended data sharing configuration option is configured and thus overrides the default data sharing configuration option.

In one or more of the above embodiments, a notification may be sent via the communications module and to the computing device 110 indicating to the user the recommended data sharing configuration option. The recommended data sharing configuration option may only be configured upon confirmation or approval from the user.

Although in one or more embodiments described above the on-device application data is described as including a list of applications installed on the mobile device and levels of permission granted to the installed applications, in one or more embodiments the on-device application may only include the list of applications. For example, the risk profile may be generated by analyzing default data sharing configuration options for one or more applications in the list. As another example, the server 120 may access an existing database containing risk ratings for a number of popular applications and may obtain, from the database, a risk rating for each application listed in the on-device application data.

The risk profile of the user may be generated using additional or alternative forms or types of on-device application data. For example, the on-device application data may include internet search history data and/or activity data indicating activity performed on the computing device 110 and the on-device application data may be processed by the server to generate the risk profile. In this example, if the user has visited riskier or less-secure websites, the risk profile of the user may be generated as higher risk. As another example, if the user provides personal data on social media posts, the risk profile of the user may be generated as higher risk. In another example, activity performed on the computing device 110 may be monitored and if it is determined that the user is conducting activity outside of their risk profile, a notification may be generated and communicated via the communications module to the computing device 110 indicating to the user that they are engaged in risky or high-risk activity.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:
1. A server comprising:
a communications module;
a processor coupled to the communications module; and a memory coupled to the processor, the memory storing processor-executable instructions which, when executed, configure the processor to:

receive, via the communications module and from a monitoring application installed on a remote computing device, on-device application data;

generate a risk profile for a user based at least on the on-device application data;

configure a data sharing configuration option for sharing data associated with the user based on the risk profile for the user, the data sharing configuration option for sharing the data with a third-party application resident on the remote computing device, the third-party application excluded when generating the risk profile for the user; and share the data from the server to the third-party application resident on the computing device based on the data sharing configuration option.

2. The server of claim 1, wherein the third-party application is not represented by the on-device application data.

3. The server of claim 1, wherein the on-device application data includes at least one of a list of applications installed on the remote computing device and levels of permission granted to the installed applications.

4. The server of claim 3, wherein generating the risk profile comprises obtaining a score for at least a plurality of applications in the list of applications and generating the risk profile from the scores.

5. The server of claim 3, wherein generating the risk profile comprises obtaining a score for at least a plurality of the levels of permission and generating the risk profile from the scores.

6. The server of claim 1, wherein the data sharing configuration option specifies one or more types of data to be shared.

7. The server of claim 1, wherein configuring the data sharing configuration option for sharing data associated with the user based on the risk profile for the user comprises:

sending, via the communications module and to the remote computing device, a recommended data sharing configuration option;

receiving, via the communications module and from the remote computing device, confirmation of the recommended data sharing configuration option; and configuring the recommended data sharing configuration option.

8. The server of claim 1, wherein configuring the data sharing configuration option for sharing data associated with the user based on the risk profile for the user comprises:

configuring a default data sharing configuration option;

comparing a risk level of the default data sharing configuration option with the risk profile of the user; and when the risk level of the default data sharing configuration option exceeds the risk profile of the user, sending, via the communications module and to the remote computing device, an indication to the user indicating that the default data sharing configuration option exceeds the risk profile.

9. The server of claim 1, wherein the data is from a data record associated with the user.

10. The server of claim 1, wherein the third-party application is represented by the on-device application data.

11. A method comprising:

receiving, via a communications module and from a monitoring application installed on a remote computing device, on-device application data;

generating a risk profile for a user based at least on the on-device application data;

configuring a data sharing configuration option for sharing data associated with the user based on the risk profile for the user, the data sharing configuration option for sharing the data with a third-party application resident on the remote computing device, the third-party application excluded when generating the risk profile for the user; and sharing the data from the server to the third-party application resident on the remote computing device based on the data sharing configuration option.

12. The method of claim 11, wherein the third-party application is not represented by the on-device application data.

13. The method of claim 11, wherein the on-device application data includes at least one of a list of applications installed on the remote computing device and levels of permission granted to the installed applications.

14. The method of claim 13, wherein generating the risk profile comprises obtaining a score for at least a plurality of applications in the list of applications and generating the risk profile from the scores.

15. The method of claim 13, wherein generating the risk profile comprises obtaining a score for at least a plurality of the levels of permission and generating the risk profile from the scores.

16. The method of claim 11, wherein the data sharing configuration option specifies one or more types of data to be shared.

17. The method of claim 11, wherein configuring the data sharing configuration option for sharing data associated with the user based on the risk profile for the user comprises:

sending, via the communications module and to the remote computing device, a recommended data sharing configuration option;

receiving, via the communications module and from the remote computing device, confirmation of the recommended data sharing configuration option; and configuring the recommended data sharing configuration option.

18. The method of claim 11, wherein configuring the data sharing configuration option for sharing data associated with the user based on the risk profile for the user comprises:

configuring a default data sharing configuration option;

comparing a risk level of the default data sharing configuration option with the risk profile of the user; and when the risk level of the default data sharing configuration option exceeds the risk profile of the user, sending, via the communications module and to the remote computing device, an indication to the user indicating that the default data sharing configuration option exceeds the risk profile.

19. The method of claim 11, wherein the third-party application is represented by the on-device application data.

20. A non-transitory computer-readable storage medium storing instructions that when executed by a processor of a computing system cause the computing system to:

receive, via a communications module and from a monitoring application installed on a remote computing device, on-device application data;

generate a risk profile for a user based at least on the on-device application data;

configure a data sharing configuration option for sharing data associated with the user based on the risk profile for the user, the data sharing configuration option for sharing the data with a third-party application resident on the remote computing device, the third-party application excluded when generating the risk profile for the user; and share the data from the server to the third-party application resident on the remote computing device based on the data sharing configuration option.

\* \* \* \* \*